United States Patent [19]

Owen

[11] 3,926,843
[45] Dec. 16, 1975

[54] FCC — MULTI-STAGE REGENERATION PROCEDURE
[75] Inventor: Hartley Owen, Belle Mead, N.J.
[73] Assignee: Mobil Oil Corporation, New York, N.Y.
[22] Filed: Mar. 26, 1973
[21] Appl. No.: 345,053

[52] U.S. Cl. ............. 252/417; 23/288 B; 23/288 S; 208/120; 208/164
[51] Int. Cl.² ..................... B01J 29/38; B01J 21/20
[58] Field of Search ........... 252/417, 419; 208/164, 208/153, 120; 23/288 B, 288 S

[56] References Cited
UNITED STATES PATENTS

| | | | |
|---|---|---|---|
| 2,382,382 | 8/1945 | Carlsmith et al. ............ | 252/417 |
| 2,401,739 | 6/1946 | Johnson ........................ | 252/417 |
| 2,436,927 | 3/1948 | Kassel ........................... | 252/417 |
| 2,698,281 | 12/1954 | Leffer .......................... | 252/417 |
| 2,906,703 | 9/1959 | Valle ............................. | 208/164 |
| 3,356,790 | 2/1971 | Schwarzenbeck ............. | 208/153 |
| 3,364,136 | 1/1968 | Chen ............................. | 252/416 |
| 3,494,858 | 2/1970 | Luckenbach .................. | 208/164 |
| 3,647,714 | 3/1972 | White ........................... | 252/417 |
| 3,661,799 | 5/1972 | Cartmell ....................... | 252/417 |

FOREIGN PATENTS OR APPLICATIONS 2,256,276  6/1973  Germany ........................ 252/417

Primary Examiner—Winston A. Douglas
Assistant Examiner—P. E. Konopka
Attorney, Agent, or Firm—Charles A. Huggett; Carl D. Farnsworth

[57] ABSTRACT

The method and sequence of steps for regenerating particularly fluid cracking catalyst which takes advantage of the conversion of carbon monoxide formed in the regeneration sequence to heat the fluid catalyst is described.

4 Claims, 2 Drawing Figures

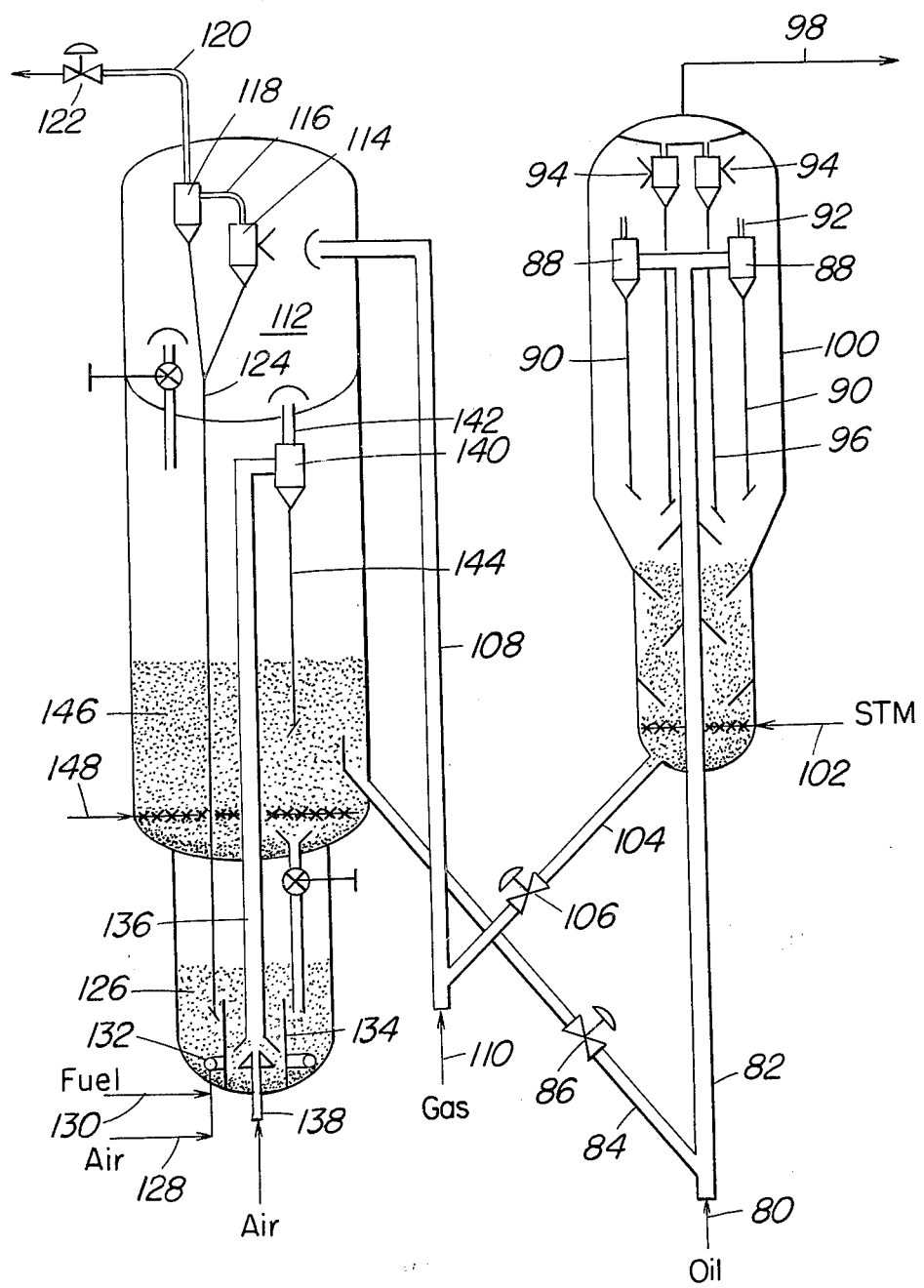
FIG. II

FCC — MULTI-STAGE REGENERATION PROCEDURE

BACKGROUND OF THE INVENTION

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalysts new areas of operating technology have been encountered requiring even further refinements in processing techniques to take advantage of the high catalyst activity, selectivity and operating sensitivity. The present invention therefore is concerned with a combination operation comprising hydrocarbon conversion and regeneration of the catalyst employed therein. In a particular aspect the present invention is concerned with the technique of regenerating a hydrocarbon conversion catalyst containing deactivating deposits of carbonaceous material.

SUMMARY OF THE INVENTION

The present invention relates to the combination of hydrocarbon conversion in the presence of finely divided catalyst particles of fluid particle size and regeneration of the catalyst particles recovered from the hydrocarbon conversion zone. In a particular aspect the present invention is concerned with a multi-stage regeneration procedure designed to improve upon the recovery of available heat by the burning of deposited hydrocarbonaceous material on the catalyst particles. In a more particular aspect the regeneration technique of the present invention incorporates the use of multiple stages of catalyst contact in the presence of combustible material in conjunction with multiple stages of cyclonic separation. That is after an initial dispersed phase contact of contaminated hydrocarbon conversion catalyst with oxygen containing gaseous material and cyclonic separations of gases from catalyst particles, enough residence time is provided to allow conversion of CO (carbon monoxide) in the gases to $CO_2$ (carbon dioxide) in the presence of excess oxygen thus providing for a large increase in temperature. Catalyst particles discharged from the initial dispersed phase contact as accomplished for example in an initial riser regeneration stage is caused to come in contact with the gases of increased temperature in a direct contact heat exchange step which will raise the catalyst to a higher regeneration temperature. Thereafter the mixture of the hot flue gases and catalyst particles in direct heat exchange relationship is sent to cyclone separation to separate the flue gases from partially regenerated catalyst particles. The partially regenerated catalyst is then transferred to a second stage of contact with oxygen containing regeneration gases to effect a more complete regeneration thereof by burning of residual carbonaceous deposits. In the second stage of catalyst regeneration, it is contemplated collecting the catalyst first as a relatively dense fluid bed of catalyst material which is subjected to oxygen regeneration conditions or the fluid bed may be mixed with hot regenerated catalyst particles at an elevated temperature in the range of 1200° to 1400°F. and obtained as discussed below to raise the temperature thereof to a higher level before the catalyst is subjected to a further oxygen regeneration. This second regeneration step may be accomplished in a relatively dense bed of catalyst or the catalyst regeneration may be accomplished in a second riser regenerator. In this second high temperature regeneration step, the catalyst undergoes a substantially more complete regeneration and is separated from regeneration gases by one or more cyclone separators. The regeneration catalyst thus separated is collected as a high temperature fluid bed of regenerated catalyst which is thereafter conveyed as desired by appropriate standpipes to one or more stages of hydrocarbon conversion. A portion of the regenerated catalyst at a temperature in the range of 1200° to 1400°F. is recycled as mentioned above for admixture with catalyst passed to the high temperature regeneration step. The regeneration gases separated from a second stage of regeneration and being at an elevated temperature are mixed with the catalyst and gases discharged from the first riser for heat exchange therewith as defined above.

Regenerated catalyst at an elevated temperature in excess of 1000°F. is withdrawn from the regenerator and passed to one or more separate stages of hydrocarbon conversion. For example, there may be employed a plurality of riser reactors to which virgin and recycle feed is separately passed or other combinations thereof described in copending applications may be relied upon for converting hydrocarbons in the presence of the hot catalyst particles.

In the hydrocarbon conversion sequence of the processes herein discussed, the principal conditions of operation such as time, temperature and pressure governing the conversion of hydrocarbon materials in the presence of finely divided solid catalytic material may be varied over a wide range of conditions and these conditions will depend upon the type of hydrocarbon material converted, the products desired and the extent of conversion desired to gasoline boiling range products. Generally it is applicant's desire to maintain the temperature of the catalyst recovered from the regenerator above about 1000°F. and up to as high as 1400°F. so that one or more riser reactor may be maintained at cracking temperature conditions selected from within the range of about 900°F. up to about 1400°F. As suggested above, the time of contact of the hydrocarbon reactant with the catalyst in the riser reactor will be maintained in the range of from about 0.5 seconds up to about 10 seconds depending upon the refractiveness of the hydrocarbons treated, the catalyst to oil ratio employed as well as the temperature employed. Also a catalyst/oil ratio within the range of from about 3 to about 30 to 1 is contemplated.

In the catalyst system discussed herein it is contemplated employing a cracking catalyst of a fluidizable particle size so that it can be passed through the system in fluid flow arrangement by a combination of risers and standpipes which include the hydrocarbon conversion sequence, stripping of the catalyst and regeneration of the catalyst particles. Accordingly the catalyst particles will be of a size falling within the range of 10 to about 100 microns and preferably within the range of from about 40 to about 80 microns.

The cracking catalyst employed in the system of this invention may comprise a single or dual cracking component in combination with one another as separate discreet particles or combined to form a single catalyst particle. In particular the regeneration sequence of the present invention is widely applicable and may be used in a wide variety of chemical and petroleum processes wherein finely divided solid particulate material is employed. Therefore the solid material may be substantially inert or catalytic in nature or a mixture of inerts and catalytic material may be used which are capable of being regenerated and which will substantially retain their solid sub-divided state under the conditions to which they are exposed in the combination of steps herein described. Accordingly activated naturally occurring cracking catalysts of the type known as filtrol, kaolin or other activated naturally occurring cracking catalysts as well as synthetically prepared cracking catalysts containing silica and alumina with or without promoter may be employed. It is also contemplated employing solid sub-divided inert material such as sand, pumice, spent cracking catalyst, kieselguhr, petroleum coke, alone or in combination with finely divided catalytic material in varying proportions as well as mixture of naturally occurring and synthetically prepared silica/alumina containing cracking catalysts. In one embodiment it is contemplated employing from about 50% up to about 95% of finely divided solid relatively inert material in physical admixture with an active catalytic agent or a mixture of synthetically prepared and naturally occurring silica/alumina cracking catalyst may be employed in physical admixture with from about 50% to about 95% of relatively inert finely divided solid material.

In addition to the above it is contemplated employing a dual function catalyst composition in homogeneous admixture or as separate discreet catalyst particles comprising different average pore size materials with one of the catalyst compositions being a crystalline aluminosilicate cracking component. In this embodiment the catalyst mixture comprises in combination a crystalline zeolite cracking catalyst selected from one of the X and Y faujasite variety in operational combination with a ZSM-5 type crystalline aluminosilicate conversion catalyst. On the other hand, the dual function catalyst may comprise an amorphous-zeolite cracking catalyst composition in combination with a ZSM-5 crystalline aluminosilicate conversion catalyst. In any of these combinations the regeneration of catalytic material is carried out under those conditions of temperature, pressure and space velocity which will optimize substantially the recovery of available heat due to the burning of carbonaceous material and products therefrom in the regeneration sequence of steps.

The novel processing combination of this invention is particularly suitable for use in catalyst systems relying upon high activity crystalline zeolite catalysts considered to be relatively low coke producing catalyst compositions when compared with amorphous silica-alumina cracking compositions and thus one may employ such catalysts alone or a mixture of such catalyst particles wherein each component of the catalyst acts substantially independently upon various hydrocarbon constituents encountered in the conversion thereof. Thus the system of the present invention is particularly useful wherein a large pore crystalline aluminosilicate having a pore size in excess of about 9 Angstroms is used in combination with a relatively small pore crystalline aluminosilicate component having a maximum pore size generally less than about 9 Angstroms and preferably in the range of from about 6 to about 7 Angstroms. The small pore crystalline zeolite contemplated for use is preferably a ZSM-5 type of crystalline material. The large pore crystalline aluminosilicate is preferably of the X or Y type of faujasite as well as a crystalline zeolite known as zeolite L.

The crystalline zeolites above identified may be exchanged, combined, dispersed or otherwise intermittently admixed with a pore matrix material. By porous matrix material it is intended to include inorganic or organic compositions with which the crystalline aluminosilicate may be affixed. The matrix may be active or substantially inactive to hydrocarbon conversion reactions encountered. The preferred porous matrix may be selected from the group comprising inorganic oxides such as clay, acid treated clay, silica alumina etc. A more complete description of a catalyst composition comprising ZSM-5 type materials which may be used with advantage in the combination of this invention and their method of preparation are disclosed in copending applications. ZSM-5 type of materials are disclosed and claimed in copending application Ser. No. 865,472 filed Oct. 10, 1969, with ZSM-8 included in the family of ZSM-5 type zeolites as disclosed and claimed in copending application Ser. No. 865,418 filed Oct. 10, 1969. In a more specific embodiment ZSM-5 type crystalline aluminosilicates may have a silica/alumina ratio of at least 10 and range up to about 300 or more.

Hydrocarbon charge stocks which may be converted with considerable success in the combination of this invention includes petroleum fractions having an initial boiling point of at least 400°F. and a final boiling point above 600°F. and preferably up to about 950° or 1100°F. Hydrocarbons boiling above 400°F. include gas oils, residual oils, cycle stocks, oil type crudes and heavy hydrocarbon fractions derived by destructive hydrogenation processes. These hydrocarbon charge materials may be used alone or in combination with one another as the charge to the first riser reactor of the hydrocarbon conversion stage. On the other hand, if more than one riser reactor is employed it is generally preferred to employ virgin feed in one riser with recycle or residual feed in the separate second riser reactor. On the other hand it is contemplated providing feed in the riser reactor above the bottom inlet thereof so that the virgin charge may be combined with a catalyst initially introduced to the riser and recycle or residual hydrocarbon fraction introduced in a downstream portion of the riser reactor. In any of these combinations the suspension formed and passed through the riser reactors is separated preferably in cyclone separators so that a greater control on the reaction time may be had for the more efficient production of desired boiling range products. The separated catalyst is thereafter collected, stripped with a suitable stripping medium and then passed through the sequence of catalyst regeneration steps comprising the combination of the present invention.

BRIEF DESCRIPTION OF THE DRAWINGS

FIG. 2 diagrammatically depicts a side-by-side regenerator hydrocarbon conversion system employing multiple riser regenerators in combination with a separate direct heat recovery vessel which adapts the regeneration concepts going to the essence of the present invention.

DISCUSSION OF SPECIFIC EMBODIMENTS

Figure 1:
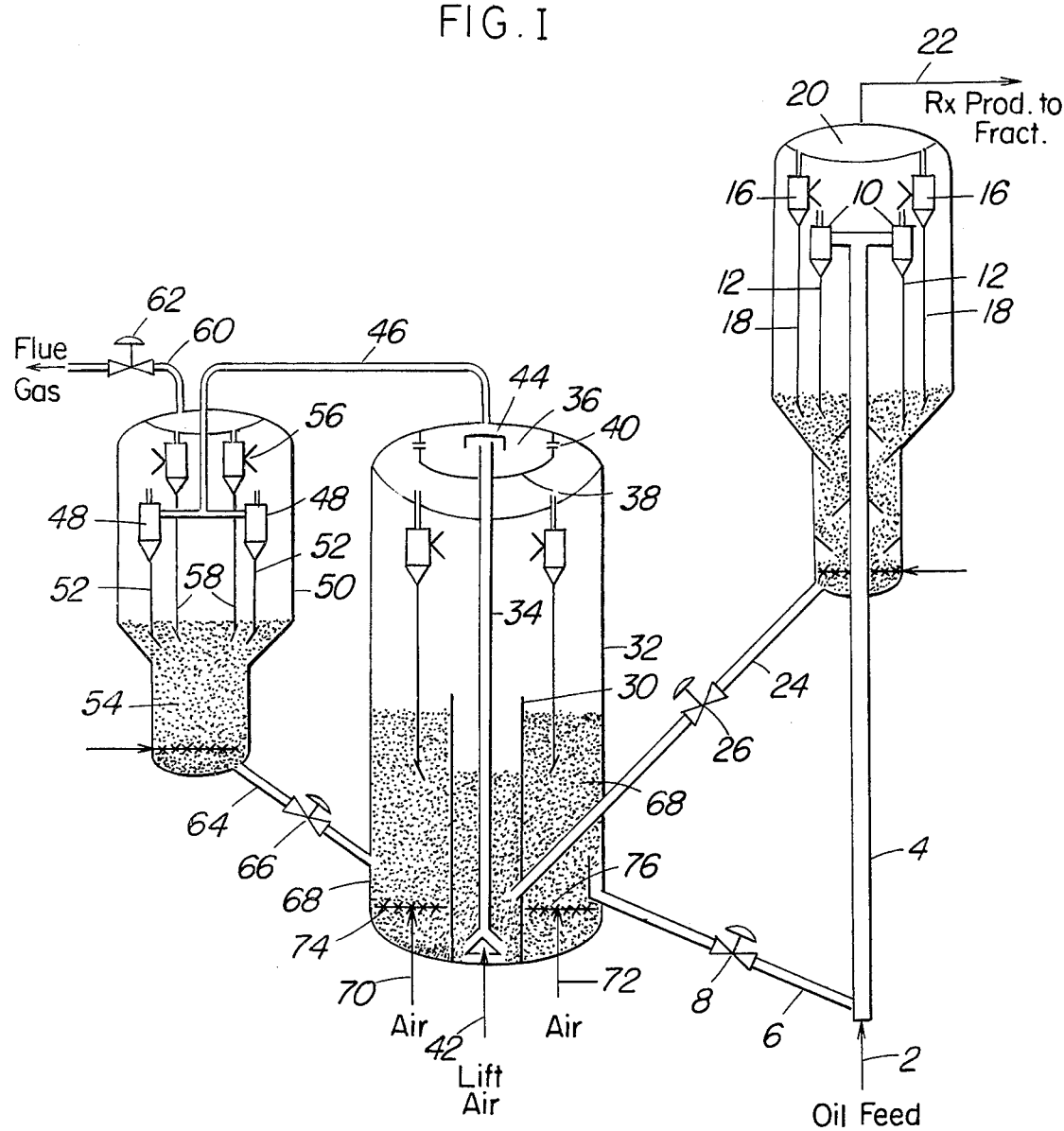
FIG. 1 diagrammatically depicts in elevation a processing scheme comprising a single riser reactor conversion stage in combination with a plurality of catalyst regeneration stages.

Referring now to FIG. 1 by way of example, an oil feed material comprising a virgin oil feed material is introduced by conduit 2 to the base of riser 4. Hot freshly regenerated catalyst is introduced to the base of riser 4 by standpipe 6 containing flow control valve 8. The catalyst and oil feed are mixed to form a suspension which is passed upwardly through riser 4 under cracking temperature conditions selected from within the range of 800°F. up to about 1200°F. The suspension passes upwardly through the riser at a velocity selected to maintain the hydrocarbon residence time within the range of 0.5 to about 10 seconds before discharge into one or more cyclone separators 10 provided on the discharge end of riser 4. In the specific arrangement of the figure, the riser is shown terminating in a "T" connection with a cyclone separator at each end of the T. Of course more than one cyclone in sequential arrangement may be employed in place of the single cyclone shown. In cyclone separator 10, the catalyst is separated from hydrocarbon vapors with the separated catalyst being passed by dipleg 12 to a mass of catalyst therebelow recovered as a dense fluid bed of catalyst moving downwardly through a catalyst stripping zone and countercurrent to steam or other suitable stripping gas introduced by conduit 14. Stripping gas, stripped products of reaction and hydrocarbon vapors discharged from cyclones 10 are caused to flow through additional cyclone separators 16 containing dipleg 18. Gasiform material comprising hydrocarbons and stripping gas is separated from catalyst particles in cyclones 16, passed into plenum chamber 20 and thereafter withdrawn by conduit 22 for passage to suitable product recovery equipment such as a fractionator and other known downstream separation equipment. Separated catalyst is conveyed by dipleg 18 to the collected bed of catalyst therebelow.

Stripped catalyst is removed from the stripping zone by conduit 24 containing flow control valve 26 and is passed to a fluid bed of catalyst 28 maintained confined by a cylindrical baffle member 30 in the lower portion of a regeneration vessel 32. A riser regenerator 34 extends from a lower portion of catalyst bed 28 to an upper separate chamber portion 35 of the regenerator vessel housing a chamber 36 separated by baffle 38 wherein the riser terminates. Open passageways 40 of limited pressure drop are provided in baffle 38 separating chamber 35 and chamber 36.

Lift gas such as oxygen containing regeneration gas, air or a mixture of fuel gas and air introduced by plug valve 42 conveys catalyst from fluid bed 28 upwardly through riser regenerator 34 for discharge into chamber 36. A cap 44 or other suitable arrangement such as a bird cage is provided at the discharge end of the riser to change the direction of flow of the upwardly flowing suspension and effect a contact of the discharged suspension with hot gaseous products of regeneration introduced to chamber 36 by passageways 40 from chamber 35. During operation gaseous products of regeneration comprising carbon monoxide discharged in chamber 35, as discussed below, are burned and then pass into chamber 36 by passageways 40. During passage of the stripped catalyst containing carbonaceous deposits upwardly through riser regenerator 34, burning of carbonaceous material causes the temperature of the suspension to achieve a temperature within the range of 900 to about 1150°F. before discharge into chamber 36. In chamber 36, carbon monoxide in the gaseous components discharged into the chamber is also caused to be converted to carbon dioxide thereby developing further heat which is directly exchanged with catalyst particles passed through riser 34 to chamber 36 and thence from chamber 36 by conduit 46 to cyclone separators 48 provided in vessel 50. In vessel 50, catalyst separated by cyclone 48 is conveyed by dipleg 52 to a fluid bed of catalyst particles 54. Gaseous products separated in cyclone 48 are discharged into the upper part of vessel 50 and enter a second stage of cyclone 56 provided with dipleg 58. The fluid bed of catalyst 54 collected in the lower portion of vessel 50 may be stripped with relatively inert gaseous material or contacted with a mixture of fuel gas and air or air alone so that a further heating of the catalyst may be obtained. Flue gases and other gaseous material existing in vessel 50 are withdrawn by way of one or more cyclone separators 56 for separation of catalyst particles therefrom before passing into a plenum chamber and withdrawal by conduit 60 provided with valve 62. Catalyst in a heated condition in the range of 1000° to about 1350°F. is withdrawn from bed 54 by conduit 64 containing valve 66 and conveyed to a dense fluid bed of catalyst 68 maintained in the lower portion of regeneration vessel 32. The dense fluid bed of catalyst 68 is further contacted with regeneration gas such as air introduced to a lower portion of the bed by conduits 70 and 72 terminating in suitable regeneration gas distributor grids 74 and 76. During the regeneration of the catalyst in bed 68 as a final stage of regeneration the temperature of the catalyst is raised to a temperature in the range of 1200°F. to 1425°F. The regenerated catalyst may be withdrawn from an upper or lower portion of the bed of catalyst by conduit 6 for conveyance to the hydrocarbon conversion riser reactor 4. Of course there may be two or more separate regenerated catalyst streams withdrawn from bed 68 for admixture with different hydrocarbon feeds in separate riser reactors.

In the arrangement of FIG. 2, the regenerator is a multi-riser unit relying upon several stages of sequential contact to remove carbonaceous deposits and heat the catalyst to an elevated temperature.

In FIG. 2, an oil feed is introduced by conduit 80 to the base of riser 82 wherein it is combined with hot regenerated catalyst introduced by conduit 84 containing flow control valve 86. The hot catalyst and oil feed form a suspension which is then passed upwardly through the riser under selected cracking temperature, space velocity and pressure conditions discussed above to obtain a desired conversion of the oil feed. The riser terminates in an open ended T connection provided with cyclone separators 88 on each end thereof. In cyclone separators 88, the catalyst oil suspension comprising products of cracking is separated with the separated catalyst withdrawn by diplegs 90 and vaporous material comprising products of cracking being discharged by conduit 92. The hydrocarbon vapors in conduit 92 may be passed directly to conduit 98 by a suitable connecting conduit not shown or passed through cyclone 94 as shown in the drawing. The hydrocarbon vapors in conduit 92 may be combined with vaporous material in the upper portion of vessel 100 which has been stripped from the catalyst before entering cyclone separators 94 provided with dipleg 96. In any event hydrocarbon vapors and stripping gas are withdrawn by way of separator 94 and conduit 98 for passage to suitable recovery equipment not shown.

Catalyst separated in 88 and 94 is passed by diplegs 90 and 96 to a bed of catalyst moving downwardly through a stripping zone in the lower portion of the vessel 100 and countercurrent to stripping gas introduced by conduit 102. Stripped catalyst containing carbonaceous deposits of cracking is removed from the stripping zone by conduit 104 provided with flow control valve 106. The stripped catalyst is passed to a riser regenerator 108 to which regeneration gas is introduced by conduit 110. The regeneration gas comprising oxygen mixes with the catalyst to form a suspension which moves upwardly through the riser under conditions selected to heat the catalyst to a temperature in the range of 900°F. to about 1150°F. before discharge into chamber 112. A deflector device or bird cage is provided about the end of riser 108 to dissipate the velocity of the suspension discharged therefrom. In chamber 112 sufficient residence time is provided to convert (CO) carbon monoxide in the gaseous effluent to ($CO_2$) carbon dioxide thereby raising the temperature of the mixture above that of the suspension discharged from riser 108 before passage thereof into cyclone separator 114 connected to cyclone separator 118 by conduit 116. Gaseous products of regeneration are removed from separator 118 by conduit 120 provided with valve 122. All of the catalyst passed through riser 108 and separated in cyclone separators 114 and 118 is withdrawn therefrom and passed by one or more catalyst diplegs 124 to a lower fluid bed of catalyst 126. Catalyst collected in fluid bed 126 is at an elevated temperature within the range of 1000°F. to about 1350°F. and may be further heated to a higher temperature by regeneration with air alone or in combination with a combustible fuel introduced to the lower portion of the bed by conduits 128 and 130 communicating with a distributor ring 132. A cylindrical baffle 134 positioned in the lower portion of bed 126 provides a well of catalyst about the lower inlet end of a second riser regenerator 136. Regeneration gas such as air or other suitable oxygen containing gas is introduced to the bottom open end of riser 136 as by a plug valve 138. Catalyst at an elevated temperature in the range of 1200°F. to about 1350°F. is caused to flow upwardly through riser 136 as a suspension in regeneration gas wherein a further removal of carbonaceous deposits from the catalyst is accomplished thereby raising the temperature of the suspension and catalyst to a temperature in the range of 1300°F. to about 1400°F. The suspension passed upwardly through riser 136 is separated in cyclone separator 140 attached to the discharge end of the riser. In separator 140 gaseous products of regeneration are separated from the catalyst and passed by open end conduit 142 upwardly into chamber 112 where these hot regeneration gases at a temperature in the range of 1300°F. to about 1400°F. are brought in contact with the cooler suspension materials discharged from riser 108. A deflector cap, bird cage or other suitable device may be employed at the discharge end of conduit 142 to discourage the flow of catalyst particles downwardly therethrough. Hot catalyst particles separated in cyclone 140 are conveyed by dipleg 144 to a dense fluid bed of regeneration catalyst 146 therebelow. The fluid bed of regenerated catalyst 146 may be kept in an aerated fluid bed condition by the introduction of a suitable fluidizing gas as by conduit 148 connected to a distributor device for the fluidizing gas. The catalyst collected in fluid bed 146 may be further regenerated and/or heated if such is warranted by the addition of combustible material to the bed. Regenerated catalyst is withdrawn from catalyst bed 146 and conveyed by conduit 84 to the hydrocarbon conversion stage of the process. As identified with respect to FIG. 1 there may be more than one separate hydrocarbon conversion zone and separate streams of regenerated catalyst may be passed to each thereof.

In accordance with the concepts herein before presented, it has been visually observed of a catalyst mixture comprising separate particles of "Y" faujasite cracking component in admixture with particles of ZSM-5 type catalyst that essentially the major portion of the deposited coke forms on the particle containing the "Y" faujasite cracking component. The ZSM-5 type catalyst particle on the other hand appeared clean by comparison and could be hand separated. Accordingly adding an oxidation catalyst such as chromium oxide to the ZSM-5 type particle to promote the conversion of carbon monoxide to carbon dioxide without appreciably affecting the hydrogen in the coke laid down on the faujasite cracking component was examined. The oxidation promoter thus added is effective in yielding a higher carbon dioxide to carbon monoxide ratio in the flue gases and therefore a greater heat release in the regenerator to the catalyst is realized. Thus by restricting the amount of oxidation promoter in the catalyst as identified above no appreciable effect on the cracking operation is observed even though the amount of oxidation promoter is large enough to achieve an advantage in the conversion of carbon monoxide to carbon dioxide in the regeneration system.

EXAMPLE

A concept of the invention herein described is concerned with regeneration of the catalyst in a manner which will enhance the recovery of available heat as by increasing the ratio of carbon dioxide to carbon monoxide in the regenerator flue gas through combustion and recovering the heat thus generated as by direct heat exchange with catalyst particles. To promote the conversion of carbon monoxide to carbon dioxide an oxidation catalyst promoter was combined with the ZSM-5 type catalyst particle component because of low coke deposition thereon. From the Arthur Curve (Arthur, J. R. Transactions, Faraday Society, Vol. 47, page 164, 1951) it is ascertained that the $CO_2/CO$ ratio at 1100°F. is 0.6. However when subjecting a cracking catalyst comprising 15% by weight REY dispersed in a silica-zirconia clay matrix to regeneration at the same temperature of 1100°F. after deposition of coke thereon a $CO_{2/CO}$ $_{ratio\ of}$ 0.57 was obtained. However the same cracking catalyst in admixture with separate particles comprising $Cr_2O_3$ in an amount equivalent to 0.34% by weight $Cr_2O_3$ produced during regeneration a $CO_2/CO$ ratio of 0.75. On the other hand, providing the REY zeolite cracking catalyst particle with 0.34% by weight $Cr_2O_3$ produced during regeneration a $CO_2/CO$ ratio of 0.87. The higher $CO_2/CO$ ratio obtained is indicative of the enhanced conversion of carbon monoxide by the oxidation catalyst thereby improving upon the generation of heat available in the process. The regeneration steps of the present invention are directed to recovering by direct heat exchange with the catalyst, the increased heat released by the exothermic conversion of CO to $CO_2$.

EXAMPLE

The catalyst regeneration concepts of the present invention were examined in considerable detail for the purpose of comparing a base case involving no flue gas heat exchange or recycle of hot regenerated catalyst with variations thereof encompassing the improved processing concepts of this invention. The table below presents the results obtained in this comparison. In example 1 (first column of data) there was no flue gas heat exchange and no hot regenerated catalyst was recycled and combined with the spent catalyst. In example 2, only flue gas heat exchange was utilized. In example 3, only catalyst recycle was utilized and in example 4, the combination of catalyst recycle and flue gas heat exchange was employed.

Table

| Example | 1 | 2 | 3 | 4 |
|---|---|---|---|---|
| Mixing with flue gas | No | Yes | No | Yes |
| Temp. of spent catalyst in °F. | 960 | → | → | → |
| after mixing °F. | 960 | 1000 | 1155 | 1195 |
| Dense bed |  |  |  |  |
| Temp. air in °F. | 1000 | → | → | → |
| Holdup tons | 21 b/d | → | 29 | → |
| Density lb/ft$^3$ | 9 | → | 12 | → |
| $CO_2/CO$ | 1.00 | 1.39 | 2.27 | 3.37 |
| 1000 lb air/hr | 280 | → | → | → |
| Dilute phase |  |  |  |  |
| Holdup, tons | 4½ | → | 10.5 | → |
| Density, lb/ft$^3$ | 3 | → | 7 | → |
| 1000 air added/hr at 325°F. | 0 | → | → | → |
| Recycle/sp.cat. | 0 | → | 1.0 | → |
| Dense bed outlet |  |  |  |  |
| Temp. °F. | 1215 | 1295 | 1315 | 1370 |
| C wt.% | .18 | .09 | .06 | .04 |
| CO mole % | 5.9 | 5.7 | 4.3 | 3.3 |
| $O_2$ mole % | 5.8 | 4.0 | 2.9 | 1.9 |
| Dilute phase |  |  |  |  |
| Outlet temp.°F. | 1325 | 1390 | 1355 | 1400 |
| C wt.% | .10 | .06 | .05 | .04 |
| CO mole % | <.01 | <.01 | <.01 | <.01 |
| $O_2$ mole % | 1.2 | .4 | .2 | .05 |
| lb. Air/lb coke burned | 14.5 | 13.7 | 13.5 | 13.3 |

Note:
Air preheated by line-burner from 325°F.
7% Hydrogen in coke
1200 TPH of spent catalyst with 0.8% combustibles
29 psig
3000 ft$^3$ dilute phase It will be observed upon examination of the Table above, that the combination of Example 4 produced catalyst at a higher temperature with lower residual coke on catalyst than obtained in the other examples and thus a greater heat recovery was achieved. It will also be observed that Example 4 took less air per pound of coke burned.

Having thus provided a general discussion of the improved catalyst regeneration system and technique of this invention and described specific examples in support thereof, it is to be understood that no undue restrictions are to be imposed by reason thereof except as defined by the following claims.

I claim:

1. A method for regenerating a hydrocarbon cracking catalyst comprising crystalline aluminosilicate containing carbonaceous deposits which comprises,
   a. passing hydrocarbon cracking catalyst containing carbonaceous deposits as a first suspension in oxygen containing regeneration gas through a first riser regeneration zone,
   b. combining the suspension after traverse of said first regeneration zone with gaseous products of combustion obtained from at least a third catalyst regeneration zone under conditions to convert available carbon monoxide to carbon dioxide and heat the catalyst therewith to a further elevated temperature by direct heat exchange in a segregated heat exchange zone and then cyclonically separating catalyst with carbon residue from gaseous products of combustion,
   c. passing heated catalyst with carbon residue separated after said direct heat exchange step to a second regeneration zone,
   d. further combusting said heated catalyst with carbon residue in a second regeneration zone under conditions to further remove carbon residue by burning in oxygen containing gas,
   e. passing catalyst from said second regeneration zone to a dense fluid bed of catalyst retained in a third catalyst regeneration zone,
   f. contacting said dense fluid bed of catalyst in a third regeneration zone with additional oxygen containing gases under elevated temperature catalyst regeneration conditions sufficient to produce gaseous products of combustion,
   g. combining the gaseous products thus produced with the suspension of said first regeneration zone as recited above and
   h. withdrawing catalyst from said third regeneration zone at an elevated temperature for use in cracking hydrocarbons.

2. The method of claim 1 wherein the catalyst regenerated contains an oxidation promoter for the conversion of carbon monoxide to carbon dioxide.

3. The method of claim 1 wherein the catalyst regenerated is a dual function catalyst comprising crystalline zeolite of the class represented by ZSM-5 crystalline material in combination with a carbon monoxide oxidation promoter.

4. The method of claim 1 wherein a combustible fuel is added to the second stage of catalyst regeneration with oxygen containing regeneration gas.

* * * * *